June 11, 1968 A. ALTMANN 3,388,213

SYNCHRONOUS DEMODULATOR CIRCUIT FOR COLOR TELEVISION RECEIVERS

Filed Nov. 24, 1965

Inventor:

ALBRECHT ALTMANN by: [signature] Atty 3,388,213

SYNCHRONOUS DEMODULATOR CIRCUIT FOR COLOR TELEVISION RECEIVERS

Albrecht Altmann, Hildesheim, Germany, assignor to Blaupunkt-Werke G.m.b.H., Hildesheim, Germany, a limited-liability company Filed Nov. 24, 1965, Ser. No. 509,553
Claims priority, application Germany, Jan. 15, 1965, B 80,123
10 Claims. (Cl. 178—5.4)

ABSTRACT OF THE DISCLOSURE

Disclosed is a synchronous demodulator for color television receivers wherein a single transistor acts as an amplifier for the reference carrier signal and as an emitter follower stage for the demodulated color difference signal output of the demodulator, providing a low impedance output.

The present invention relates to a circuit for a synchronous demodulator, or synchronous detector, for color television receivers, and more particularly to a synchronous demodulator stage using transistors. The synchronous demodulator circuit is provided to obtain a color, or chroma difference signal from the color signal by means of a color reference, or local carrier, which is applied in push-pull by means of a transformer, or transfer circuit, to a synchronous detector.

Ordinarily, a pair of synchronous demodulators are used which demodulate, with 90° difference in accordance with the I′ and Q′ axes, or with reference to the B′–Y′ and R′–Y′ axes, in order to reconstitute the color, or chroma difference signals necessary to control the cathode ray tube (CRT). The proper phase differences, or axes, can be obtained by phase shifters, inserted into the circuit between the reference carrier oscillator, which is controlled by the color synchronizing bursts, and the demodulators. For demodulation, synchronous demodulators to which the reference carriers are applied in push-pull, are particularly useful. Unfortunately, the output of such demodulators is usually a comparatively high resistance output, so that when subsequent stages utilize transistors, which load a stage, matching of the outputs cannot be obtained properly and the color difference signal is degraded.

It is of course always possible to provide an impedance matching stage between the synchronous rectifiers and subsequent stages; this, however, introduces an additional stage, which is costly. It is therefore an object of the present invention to provide a demodulator circuit which, without substantially increasing the components, provides for a low impedance output.

Briefly, in accordance with the present invention, the primary of a transformer for the reference carrier signal is placed in the collector circuit of an amplifying transistor. The color difference signal, generated in the synchronous rectifier, is connected to the base of the transistor; the color difference output signal is then obtained from the emitter circuit of the transistor. The transistor thus acts both as an amplifier for the reference carrier signal as well as an emitter follower stage for the low impedance output of the demodulated color difference signal. Thus, the reference carrier can be obtained directly form the reference carrier oscillator without additional preamplification, and at the same time sufficient power can be obtained from the output to control subsequent transistor stages of the receiver.

The structure, organization and operation of the invention will now be described more specifically in the following detailed description with reference to the accompanying drawings, in which.

Figures 1, 2:
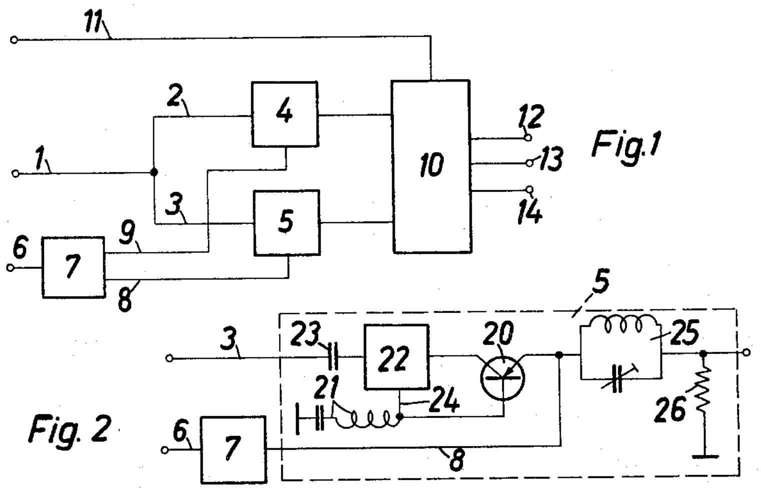
FIG. 1 is a block diagram of the color television receiver portion relating to demodulation.
FIG. 2 is a basic circuit in accordance with the present invention.

Referring now to the drawings: the color signal obtained from the video rectifier, and separated from the brightness signal is applied to terminal 1, and then over lines 2 and 3 to a pair of synchronous demodulators 4 and 5. Reference signal oscillator 7, synchronized with the color sync pulses by a control potential over line 6, supplies reference signals to synchronous demodulators 4 and 5 over lines 9 and 8. The carrier applied to demodulator 5 over line 9 is 90° phase shifted with respect to the carrier applied to demodulator 5 over line 8. The color difference signal generated in synchronous demodulators 4 and 5 is then applied to a matrix 10, together with the brightness signal from line 11, and converted into the three color signals available at output terminals 12, 13, 14.

FIG. 2 illustrates the basic circuit of the synchronous demodulator 5, for example. Low impedance output 8 of reference signal oscillator 7 supplies the reference signal to the emitter of a transistor 20. The base of transistor 20 is connected over a tank circuit 21, tuned to the reference carrier signal, for example 4.4 megacycles, and further connected to an output 24 of synchronous rectifier 22. Synchronous rectifier 22 is further connected to the collector circuit of the transistor 20. The color signal is applied from terminal 3 over a condenser 23, to the synchronous rectifier 22 for demodulation as known. Thus, the reference carrier signal applied to the emitter is amplified in the collector, and, as amplified, applied to the synchronous detector. The demodulated color difference signal, for example the R–Y signal, is applied over output 24 to the base of the transistor 20 which, as emitter follower supplies at its emitter output an amplified color difference signal, which can be taken off across the working resistance 26 of the transistor, preferably after having been filtered or blocked by a parallel tank circuit 25, likewise tuned to the reference carrier signal, that is 4.4 mc.

Figure 3:
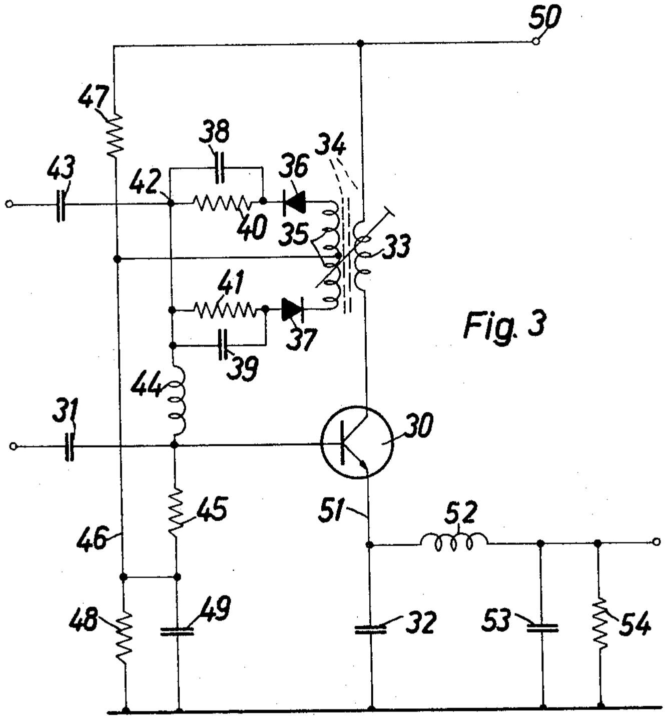
FIG. 3 is a detailed circuit of a demodulator.

FIG. 3 shows a detailed circuit of a further embodiment of the invention. The reference carrier signal is applied to the base of an npn transistor 30 over a condenser 31. The emitter of this transistor 30 is connected over a condenser 32 to ground; the condenser is so dimensioned that it presents a low impedance to the reference carrier signal, so that the primary winding 33 of a transformer 34 will have an amplified reference carrier signal passing therethrough. The secondary of transformer 34 is connected in push-pull; its winding 35 is connected to oppositely poled diodes 36, 37, which are connected to a common junction 42 over a parallel resistance capacitance network, each, 38, 40; and 39, 41. The color signal is applied to junction 42 over a condenser 43, and thus the demodulated color signal can be obtained at this junction. Condenser 43 in this instance serves simultaneously as charging condenser for the synchronous detector circuit. The demodulated color difference signal, available at junction 42, is connected back to the base by means of an inductance, or choke 44; inductance 44 is so dimensioned that it presents a comparatively large resistance to the undemodulated color signal and to the reference carrier signal. Base of transistor 30 is further connected to a resistance 45, which serves as working resistance for a synchronous rectifier; the other end of resistance 45 is connected to the center tap of secondary 35 of transformer 34, and further to an intermediate connection of a voltage divider formed of resistances 47, 48, which is connected to a source of positive potential 50, and forms, together with a connection to the primary winding 33 of transformer 34, and thus to the collector, the source for potential, and bias of the transistor 30. Condenser 49 is a by-pass condenser for high frequency, parallel with resistance 48.

Transistor 30 acts as an emitter follower for the demodulated color difference signal applied to the base of the transistor, since the primary winding 33 of transformer 34 presents only a very low resistance for this signal. The amplified color difference signal thus can be taken off at terminal 51 from the emitter over a pi-filter, consisting of condenser 32, inductance 52, condenser 53, and a working resistance 54 for transistor 30. Of course, instead of the pi-filter, a parallel tank circuit tuned to the reference carrier frequency may be used, as in FIG. 2.

The following values for components were found to be particularly useful, and are presented as an example:

| | | |
|---|---|---|
| Transistor **30** | SE | 1001 |
| Diodes **36** and **37** | OA | 91 |
| Condenser **31** | pf | 33 |
| Condenser **32** | nf | 1 |
| Condenser **38** and **39** | pf | 100 |
| Condenser **43** | pf | 100 |
| Condenser **49** | nf | 47 |
| Condenser **53** | pf | 180 |
| Potential **50** | v | +24 |
| Resistance **40** and **41** | ohms | 2.2K |
| Resistance **45** | do | 5.6K |
| Resistance **47** | do | 15K |
| Resistance **48** | do | 5.6K |
| Resistance **54** | do | 560 |
| Inductance **44** | μh | 400 |
| Inductance **52** | μh | 60 |

I claim:

1. In a color television receiver, a synchronous demodulator to reconstitute a color difference signal, a source of reference carrier signals; a synchronous detector; and transformer means applying said reference carrier to said synchronous detector; a transistor connected to amplify said reference carrier, said transformer means being connected into said collector circuit of said transistor, the signal obtained from said synchronous demodulator being applied to the base of said transistor; and means deriving said color difference output signal from the emitter circuit of said transistor.

2. Synchronous demodulator as claimed in claim 1, said source of reference carrier signals having low internal impedance and being connected to the emitter circuit of said transistor, so that said transistor will amplify said reference carrier signals.

3. Synchronous demodulator as claimed in claim 1, said source of reference carrier signals being connected between the base of said transistor and ground, and means having a low impedance for said reference carrier signals interconnecting the emitter and ground.

4. Synchronous demodulator as claimed in claim 1, said means deriving said color difference output signal including a filter connected to the emitter circuit of said transistor.

5. Synchronous demodulator as claimed in claim 4 wherein said filter includes a parallel resonant circuit tuned to the reference carrier frequency.

6. Synchronous detector as claimed in claim 1, said transistor being an npn transistor.

7. Synchronous demodulator as claimed in claim 1, said synchronous detector comprising a pair of diodes, a coupling condenser connected to the output circuit of said detector, said condenser having the color signal applied thereto; and an inductance connecting the demodulated signal to the base of the transistor.

8. Synchronous demodulator as claimed in claim 7, said coupling condenser being dimensioned to couple the color signal and act as charging condenser for the synchronous detector.

9. Synchronous demodulator as claimed in claim 1, said transformer means having a primary winding connected into the collector circuit, and a secondary, center-tapped winding; said secondary winding being connected to said synchronous detector and operating in push-pull.

10. Synchronous demodulator as claimed in claim 9 including a voltage divider having an intermediate tap; said synchronous detector having an output resistance means; said output resistance means being connected to the base of said transistor; means connecting said intermediate tap of said voltage divider to said output resistance and the center tap of the push-pull connected transformer winding to said synchronous detector, the voltage division ratio of said voltage divider determining the working point of said transistor.

No references cited.

ROBERT L. GRIFFIN, *Primary Examiner.*

R. MURRAY, *Assistant Examiner.*